United States Patent [19]

Kamp

[11] Patent Number: 4,723,286
[45] Date of Patent: Feb. 2, 1988

[54] DEMATRIXING CIRCUIT OF THE SWITCHED-CAPACITOR TYPE

[75] Inventor: Petrus J. M. Kamp, Eindhoven, Netherlands

[73] Assignee: U.S. Philips Corporation, New York, N.Y.

[21] Appl. No.: 932,956

[22] Filed: Nov. 19, 1986

[30] Foreign Application Priority Data

Nov. 19, 1985 [NL] Netherlands ............... 8503183

[51] Int. Cl.⁴ ............................................. H04H 5/00
[52] U.S. Cl. ........................................ 381/3; 358/144
[58] Field of Search ............... 381/2, 3, 4, 98, 106; 358/144

[56] References Cited

U.S. PATENT DOCUMENTS

| | | | |
|---|---|---|---|
| 4,302,837 | 11/1981 | Tanaka et al. | 381/3 |
| 4,472,830 | 9/1984 | Nagai | 358/144 |
| 4,512,031 | 4/1985 | Van Gils | 381/3 |
| 4,577,226 | 3/1986 | Avins | 358/144 |
| 4,644,580 | 2/1987 | Akabane | 358/144 |

*Primary Examiner*—Forester W. Isen
*Attorney, Agent, or Firm*—Thomas A. Briody; William J. Streeter; Gregory P. Gadson

[57] ABSTRACT

Dematrixing circuit of the switched-capacitor type for dual channel TV stereo sound signals comprising first and second signal inputs ($I_1$, $I_2$) for applying a stereo sum signal $\left(\frac{L+R}{2}\right)$ thereto and one of the two left and right stereo signals (for example, R), the amplitude of said latter stereo signal being twice as high as that of each of the two stereo signals in the stereo sum signal, and comprising first and second signal outputs ($O_1$, $O_2$) for supplying a dematrixed stereo signal. In order to provide the possibility of a correct dematrixing of the stereo signal (L), which is not separately available, with a minimum number of circuit elements and to simultaneously avoid through-connections from the two signal inputs ($I_1$, $I_2$) at one end and the two signal outputs ($O_1$, $O_2$) at the other end, the dematrixing circuit according to the invention comprises first and second capacitors ($C_1$, $C_2$) each being arranged between an input switch ($S_{i1}$, $S_{i2}$) and an output switch ($S_{O1}$, $S_{O2}$), said first capacitor ($C_1$) being arranged via its input ($S_{i1}$) and output switches ($S_{O1}$) between the first signal input ($I_1$) and in a first switching phase and between the point of reference potential and a first integrator (INT1) in a second switching phase, said second capacitor ($C_2$) being arranged via its input and output switches ($S_{i2}$, $S_{O2}$) in the first switching phase between the second signal input ($I_2$) and a third capacitor ($C_3$) which is coupled to the reference potential and in the second switching phase, being short-circuited across the reference potential said third capacitor ($C_3$) being coupled in a switchable manner via a series switch (S) to the said integrator (INT1), said series switch (S) being opened in the first switching phase and realizing a through-connection in the second switching phase, said first integrator (INT1) being coupled to the first signal input ($I_1$) and said capacitors ($C_1$–$C_3$) mutually having substantially equal values.

6 Claims, 3 Drawing Figures

FIG. 2

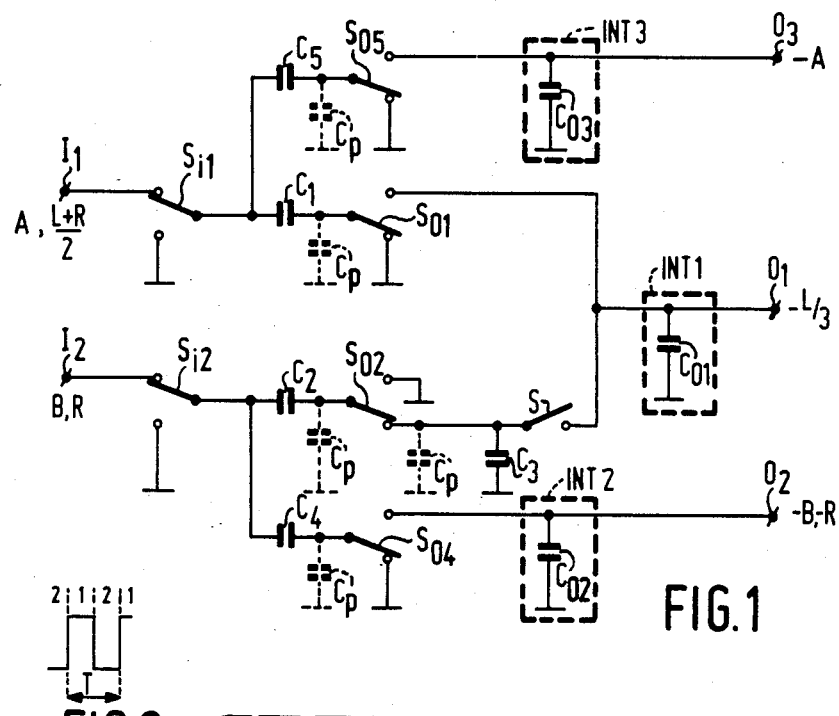
FIG.1
FIG.3
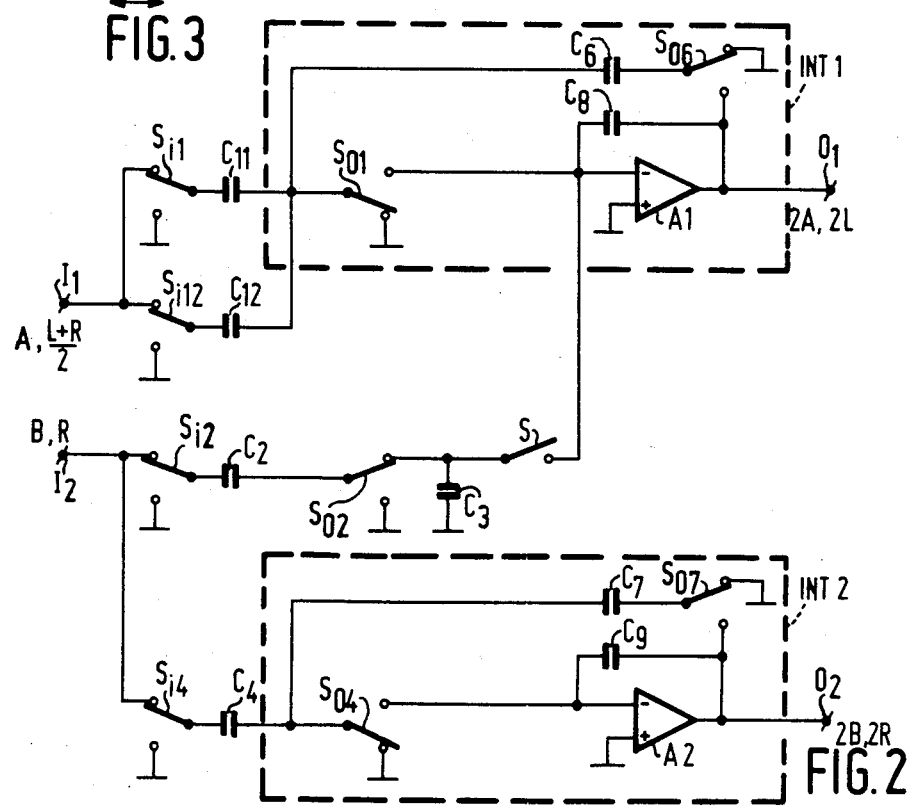
FIG.2

DEMATRIXING CIRCUIT OF THE SWITCHED-CAPACITOR TYPE

BACKGROUND OF THE INVENTION

The invention relates to a dematrixing circuit of the switched-capacitor type for dual channel TV stereo sound signals, comprising first and second signal inputs for applying a stereo sum signal $$\left(\frac{L+R}{2}\right)$$

thereto and one of the two left and right stereo signals (for example, R), the amplitude of the latter stereo signal being twice as large as that of each of the two stereo signals in the stereo sum signal, and comprising first and second signal outputs for supplying the dematrixed stereo signals.

A dematrixing circuit of this type is known from the article "Switched capacitor stereo decoder for TV and radio receivers" by A. H. M. van Roermund et al, published in IEEE Transactions on Consumer Electronics, Vol. CE-31, No. 3, August 1985, pages 461-468.

Said article describes the dematrixing circuit as part of a decoder for two TV sound signals, which may comprise stereo information or mutually independent sound information. The nature of this information is indicated by means of a signal frequency (117.5 Hz or 274.1 Hz) being AM modulated on a pilot in the channel of one of the two TV sound signals. This signal frequency is detected by means of a pilot identification circuit and used as a control signal for a selection circuit which is coupled to the output of the dematrixing circuit.

In the case of reception of TV stereo sound signals a transfer with a possible amplitude adaptation and de-emphasis of the left or right stereo signal (for example, R) applied to the second signal input is effected in the dematrixing circuit to one (for example, the said second) of the two signal outputs. The other stereo signal (in this case L) is dematrixed therein by a suitable combined processing of the signals $$\left(\frac{L+R}{2}\right)$$

and (R) applied to the two signal inputs, and is, eventually after a possible amplitude adaptation and de-emphasis, applied to the other (for example, the first) signal output. After passing through said selection circuit these two dematrixed TV left and right stereo sound signals become available at the outputs of the decoder for further audio signal processing or reproduction.

SUMMARY OF THE INVENTION

It is an object of the invention to provide a switched-capacitor dematrixing circuit in which a correct dematrixing of TV stereo sound signals of the type $$\frac{L+R}{2}$$

and R is effected with a particularly small number of elements.

To this end a dematrixing circuit according to the invention is characterized by first and second capacitors each being incorporated between an input switch and an output switch, said first capacitor being arranged through its input and output switches between the first signal input and a point of reference potential in a first switching phase and between said point of reference potential and a first integrator, in a second switching phase, said second capacitor being arranged through its input and output switches in the first switching phase between the second signal input and a third capacitor, which is coupled to the reference potential and in the second switching phase being short-circuited across the reference potential, said third capacitor being coupled in a switchable manner via a series switch to the said integrator, said series switch being opened in the first switching phase and realizing a through-connection in the second switching phase, said first integrator being coupled to the first signal output and said capacitors mutually having mainly equal values.

An integration circuit arrangement in which a circuit corresponding to that constituted by the aforementioned second and third capacitors with the input, output and series switches and the first integrator is used to obtain compensation for parasitic capacitances is known per se from the article "Parasitic compensated switched capacitor circuits" by P. E. Fleischer et al, published in IEEE "Electronic Letters", Vol. 17, No. 24, 26 Nov. 1981, pages 929-931.

The invention is based on the recognition that this prior art circuit is particularly suitable for mutual amplitude, sign and delay adaptation of samples of the stereo signal (R) applied to the second signal input to the components of this stereo signal in samples of the stereo sum signal $$\left(\frac{L+R}{2}\right)$$

applied to the first signal input.

When using the measure according to the invention the samples of the stereo sum signal are inverted in a simple manner and delayed over one switching phase or cycle and those of the relevant stereo signal are halved in amplitude and likewise delayed over one switching phase. Therefore, complete compensation of the components of the last-mentioned stereo signal is effected at the input of the first integrator in the stereo signal, there with obtaining a corrected dematrixing. Besides, a through-connection via said switches of each of the two signal inputs to the first integrator is prevented from occurring at any instant whatever, so that the time-discrete signal processing in the dematrixing circuit is not disturbed by time-continuous or so called feedthrough effects.

A preferred embodiment of a dematrixing circuit according to the invention is characterized by a fourth capacitor which is incorporated between input and output switches and is arranged via these switches between the second signal input and the reference potential in said first switching phase and between the reference potential and a second integrator in said second switching phase, said second integrator being coupled to the second signal output.

When using this measure a through-connection is prevented from occurring between the second signal input and signal output and the two dematrixed left and right stereo signals become available in mutually equal polarities at the two signal outputs.

In order to make a suitable de-emphasis possible, which can be realized in a simple manner, a further embodiment of a dematrixing circuit of this type is characterized in that each of the two integrators is provided with an operational amplifier, which is negatively fed back from the output to the inverting input through a negative feedback capacitor, said negative feedback capacitor being bridged in a switchable manner by a further capacitor which is short-circuited across the reference potential in the first clock phase and which is arranged in parallel with the negative feedback capacitor in the second clock phase.

In an existing dual channel TV stereo sound system the last-mentioned dematrixing circuit is preferably characterized in that the switching frequency is substantially 40 times the line frequency of a standardized TV signal, in that the negative feedback capacitor has a value of substantially 30 times of the further capacitor and in that the fourth capacitor has a value which is substantially equal to that of the first capacitor.

A further preferred embodiment of the dematrixing circuit, the two integrators thereof being formed with the afore-mentioned negatively fed-back operational amplifiers, is characterized in that the first capacitor comprises first and second sub-capacitors of mutually equal values, one of the sub-capacitors being arranged between the input and output switches of the first capacitor and the other sub-capacitor being arrangeable in parallel across said one sub-capacitor via at least one further switch in both switching phases, said further switch connecting one side of said other sub-capacitor continuously to the reference potential for processing and audio signal applied to the first signal input, said second capacitor being continuously short circuited across the reference potential.

When using this measure the dematrixing circuit is also suitable for transfer and eventual de-emphasis of at least a monophonic audio signal applied to the first signal input when said relevant switches are a continuously coupled to the reference potential.

In an integratable realization in which both for stereo and for dual sound signal reception equal output signal amplitudes at the two signal outputs occurs, the last-mentioned dematrixing circuit is characterized in that the capacitance of each of the sub-capacitors of the first capacitor is substantially equal to that of the said fourth capacitor and is twice the further capacitance of each of the first and second integrators.

DESCRIPTION OF THE DRAWINGS

The invention will be further described by way of example with reference to the Figures shown in the drawings.

In this drawing:

FIG. 1 shows a passive embodiment of a dematrixing circuit according to the invention;

FIG. 2 shows an active embodiment of a dematrixing circuit according to the invention and FIG. 3 shows the time-dependent amplitude variation of a clock-controlled switching signal which switches the switches in the dematrixing circuits of the two FIGS. 1 and 2 consecutively and alternately in the first and second switching phases.

DETAILED DESCRIPTION

FIG. 1 shows a dematrixing circuit according to the invention having a de-emphasis function with first and second signal inputs $I_1$ and $I_2$ to which in the case of TV stereo sound reception, the stereo sum signal $$\frac{L + R}{2}$$

and the right stereo signal R are applied, respectively, said right stereo signal R having an amplitude which is twice as large as that of each of the components of the left and right stereo signals in the stereo sum signal. In the case of dual sound signal reception mutually independent audio signals A and B are applied to the first and second signal inputs $I_1$ and $I_2$, respectively. The dematrixing circuit shown also has first, second and third signal outputs $O_1$ to $O_3$, inclusive, to which first and second signal outputs $O_1$ and $O_2$ the dematrixed and inverted left and right stereo signals $-L/3$ and $-R$ are supplied in the manner to be described hereinafter in the case of stereo reception, the amplitude of the last-mentioned left stereo signal being approximately $\frac{1}{3}$ of that of the last-mentioned right stereo signal, and to which second and third signal outputs $O_2$ and $O_3$ the monophonic inverted sound signals $-B$ and $-A$ are supplied in the case of dual sound signal reception.

The dematrixing circuit comprises a number of switches to be described hereinafter, which by means of the clock signal shown in FIG. 3, are alternately switched between two positions, the position in the first switching phase being shown in the Figure.

The dematrixing circuit comprises first and second capacitors $C_1$ and $C_2$ which are each arranged between input and output switches $S_{i1}$ and $S_{O1}$ and $S_{i2}$ and $S_{O2}$, respectively. In the first switching phase the first capacitor $C_1$ is arranged through its input and output switches $S_{i1}$ and $S_{O1}$ between the first signal input $I_1$ and a point of reference potential or earth, and in the subsequent so-called second switching phase (not shown), it is arranged between earth and an earth coupled integration capacitor $C_{O1}$ which functions as a first integrator INT1, and is coupled to the first signal output $O_1$.

As a result of this manner of switching, the signal samples which have been instantaneously stored in the first capacitor $C_1$ during the first switching phase are inverted upon switching through during the second switching phase, and at the same time the signal samples undergo a time delay upon passing the switched first capacitor $C_1$, which time delay corresponds to the duration of one switching phase, while a through-connection or socalled feed-through is prevented at any instant from being brought about between the first signal input $I_1$ and the first signal output $O_1$. In the first switching phase the second capacitor $C_2$ is arranged through its input and output switches $S_{i2}$ and $S_{O2}$ between the second signal input $I_2$ and an earth coupled third capacitor $C_3$ and in the second switching phase (not shown) it is short-circuited across the reference potential or earth. The earthed third capacitor $C_3$ is connected via a series switch S in the second switching phase (not shown) to the first integrator INT1, which connection is interrupted in the first switching phase. As a result thereof, the voltage at the second signal input $I_2$ is divided in the first switching phase over the second and third capacitors $C_2$ and $C_3$, the voltage across the third capacitor $C_3$ being passed on to the first integrator INT1 via the series switch S uninverted and delayed over the period of one switching phase. This manner of switching prevents at any instant the occurrence of a through-connection between the second signal input $I_2$ and the first signal output $O_1$.

When the second and third capacitors $C_2$ and $C_3$ have mutually equal values, the stereo signal R applied to the second signal input $I_2$ is halved in amplitude to R/2. When the first capacitor $C_1$ has a value which is also equal to each of the second and third capacitors $C_2$ and $C_3$ at the input of the first integrator INT1, the $$-\frac{R}{2}$$

component in the $$-\frac{L+R}{2}$$

signal samples, which samples are applied from the first capacitor $C_1$ to the first integrator INT1, are completely cancelled out by the R/2 signal samples which are applied thereto from the third capacitor $C_3$. As a result, only components of the inverted left stereo signal $$-\frac{L}{2}$$

are left whose amplitude changes by a factor of ⅔ as these $$-\frac{L}{2}$$

components are divided over the first, second and third capacitors $C_1$ to $C_3$, inclusive, so that the left stereo signal $$-\frac{L}{3}$$

becomes available at the first signal output $O_1$ after a given integration.

The dematrixing circuit shown is also provided with fourth and fifth capacitors $C_4$ and $C_5$ which are arranged between the input switches $S_{i1}$ and $S_{i2}$ and output switches $S_{O4}$ and $S_{O5}$, respectively. In the first switching phase shown, the capacitors $C_4$ and $C_5$ are arranged via said switches between the first and second signal inputs $I_1$ and $I_2$ and earth, respectively, and the respective input signals are sampled. In the second switching phase not shown the signal samples are passed on from the fourth and fifth capacitors $C_4$ and $C_5$, respectively, to the earthed integration capacitors $C_{O2}$ and $C_{O3}$ functioning as second and third integrators INT2 and INT3. A signal inversion occurs when the samples are passed on, so that the input signals applied to the signal inputs $I_1$ and $I_2$, for example, a monophonic sound signal A and a monophonic sound signal B, respectively, or the right stereo signal R become available after integration or de-emphasis in the integrators INT2 and INT3 at the respective signal outputs $O_3$ and $O_2$ in an inverted manner and with mutually equal amplitudes. In addition, the signal samples are delayed over the period of one switching phase upon their passing the input and output switches $S_{i1}$, $S_{i2}$ and $S_{O5}$, $S_{O4}$, respectively, and a through-connection across the last-mentioned switches is prevented so that there is no disturbance of the time-discrete signal processing, and the signals arrive at each of the three signal outputs $O_1$ and $O_3$ inclusive in a mutually time-synchronous manner and with the same polarity.

To make a simple realization in an integrated form possible, each of the fourth and fifth capacitors is chosen to be equal in a practical embodiment to each of the first up to and including the third capacitors $C_1$ to $C_3$, and the integration capacitors $C_{O2}$ and $C_{O3}$ are mutually equal. In such an integrated form, however, parasitic capacitances occur which cannot be completely avoided and may amount to 10 to 20% of the value of each of the first up to and including the fifth capacitors $C_1$ to $C_5$. These are shown in broken lines in FIG. 1 and denoted by $C_p$. Because of a suitable integration form these parasitic capacitances $C_p$ are mutually equal and have therefore no influence on the dematrixing operation.

By choosing the value of the first integration capacitor $C_{O1}$ to be equal to:

$$f_{cl} \cdot \Sigma \cdot (C + C_p)$$

and the value of each of the second and third integration capacitors $C_{O2}$ and $C_{O3}$ to be equal to $$\tfrac{1}{2}(3f_{cl} \cdot \Sigma - 1)(C + C_p)$$

wherein $f_{cl} = 1/T$, the clock frequency at which the switches are controlled, $\Sigma$ being the de-emphasis time constant,
C being the value of each of the first up to and including the fifth capacitors $C_1$ to $C_5$, and $C_p$ being the value of the parasitic capacitors, an equal time constant, and hence a mutually equal signal de-emphasis, is obtained in the three channels from $I_1$ and $I_2$ to $O_1$, from $I_2$ to $O_2$ and from $I_1$ to $O_3$. It is assumed that the highest occurring signal frequency is considerably smaller than the clock frequency $f_{cl}$.

For the German television system with a sound pre-emphasis of 50 μsec and a clock frequency $f_{cl}$ of, for example, 500 kHz, the value of the first integration capacitor $C_{O1}$ is to be 25(C+$C_p$), and that of each of the second and third integration capacitors $C_{O2}$ and $C_{O3}$ is to be 37(C+$C_p$) for a suitable de-emphasis.

Since the dematrixing circuit described sofar is a passive circuit, the noise figure of this circuit is at a minimum. It will be evident that for equal levels of the dematrixed left and right stereo signals $$-\frac{L}{3}$$

and −R a further output amplifier (or attenuator) is required.

A selection is possible by means of a selection circuit arranged subsequent to the outputs $O_1$ to $O_3$, inclusive, the said three channels of the dematrixing circuit remaining operative both for stereo reception and for dual sound signal reception. It is, however, also possible to effect selection in the dematrixing circuit by continuously connecting to earth the switch(es) suitable therefor which normally switch with the clock frequency. In the case of stereo reception, the output switch $S_{O5}$ is to be continously connected to earth, in the case of dual sound signal reception and a desired reproduction of the sound signal A, which is applied to the first signal input I1, the switches $S_{O1}$ and $S_{i2}$ (or the switches $S_{O2}$ and $S_{O4}$ instead of $S_{i2}$) are to be continously connected to earth, whereas in the case of a desired reproduction of the sound signal B, which is applied to the second signal input I2, the switches $S_{i1}$ and $S_{O2}$ or S are to be connected continuously to earth or to be opened, respectively.

FIG. 2 shows an active dematrixing circuit according to the invention in which signal de-emphasis is also effected and in which elements whose function corresponds to that of the elements in the dematrixing circuit of FIG. 1 have the same reference numerals. Unlike the foregoing passive embodiment, the active dematrixing circuit is only provided with the first and second signal outputs $O_1$ and $O_2$ and the first and second integrators INT1 and INT2 which, instead of integration capacitors, comprise first and second mutually equal operational amplifiers $A_1$ and $A_2$ positive inputs of which are connected to earth. These operational amplifiers $A_1$ and $A_2$ are negatively fed back from the output to a negative input via fixed and mutually equal negative feedback capacitors $C_8$ and $C_9$, respectively, and are bridged in the said second switching phase by mutually equal capacitors $C_6$ and $C_7$. Each of these capacitors $C_6$ and $C_7$ is short-circuited across the reference potential or earth in the first switching phase, and together with the clock frequency and the values of the negative feedback capacitors $C_8$ and $C_9$, they determine the de-emphasis time constant. By utilizing the negative inputs of the operational amplifiers $A_1$ and $A_2$ as signal inputs, a sign inversion is effected simultaneously. The outputs of these operational amplifiers $A_1$ and $A_2$ are then coupled to the signal outputs $O_1$ and $O_2$. In a practical embodiment suitable for the afore-mentioned German TV system, a de-emphasis time constant of 50 μsec was obtained by choosing the switching frequency to be equal to 625 kHz, i.e. 40×the line frequency in this system, and by choosing the value of each of the negative feedback capacitors $C_8$ and $C_9$ to be 30.75 times larger than that of each of the capacitors $C_6$ and $C_7$. Such a switching frequency can be derived from the said line frequency in a known manner by means of a phase-locked loop.

Furthermore, the first capacitor $C_1$ was realized by means of two sub-capacitors $C_{11}$ and $C_{12}$, each having half the value of the first capacitor $C_1$, both sub-capacitors being operative in parallel in the case of stereo reception, and only one being operative in the case of dual sound signal reception and a desired reproduction of the sound signal A. To this end, the sub-capacitor $C_{11}$ is arranged between the input and output switches $S_{i1}$ and $S_{O2}$, and the sub-capacitor $C_{12}$ is arranged between its own input switch $S_{i12}$, which in the latter case is continuously connected to earth, and the output switch $S_{O1}$. In order to simultaneously interrupt the channel of the sound signal B from the second signal input I2 to the second signal output O2, it may be desirable to couple also the fourth capacitor $C_4$ via its own input switch $S_{i4}$, which in the relevant case is continuously earth connected to the second signal input I2. In the case of stereo reception, the input switches $S_{i12}$ and $S_{i4}$ are connected to the first and second signal inputs I1 and I2 in the first switching phase, and in the second switching phase they are connected to earth. The capacitors $C_6$ and $C_7$ are incorporated between the output switches $S_{O1}$ and $S_{O4}$ and switches $S_{O6}$ and $S_{O7}$, respectively, through which they are arranged in parallel with the negative feedback capacitors $C_8$ and $C_9$ in the first switching phase and are short-circuited across earth the reference potentials in the second switching phase, respectively.

In the last-mentioned practical embodiment the total capacitance of the two mutually equal subcapacitors $C_{11}$ and $C_{12}$ corresponds to that of the first capacitor $C_1$ in the embodiment of FIG. 1 and each of the capacitors $C_2$ and $C_3$, and has a value which is four times higher than that of each of the capacitors $C_6$ and $C_7$, while the fourth capacitor $C_4$ has a value which is twice as high as that of each of the last-mentioned capacitors $C_6$ and $C_7$.

With this dimensioning, a gain factor of four is obtained in the case of stereo reception for the L/2 components in the stereo sum signal $$\left(\frac{L+R}{2}\right)$$

and a gain factor of two is obtained for the right stereo signal R, which signals are applied to the first and second signal inputs I1 and I2, respectively. In the case of dual sound signal reception the input switch $S_{i12}$ is continuously connected to earth, and the gain factor of the first and second signal inputs I1 and I2 to the first and second signal outputs $O_1$ and $O_2$, respectively is two, so that output signals of mutually equal amplitudes are supplied, both in the case of stereo reception and in the case of dual sound signal reception. Furthermore, the signal polarity does not change, i.e., the signals at the outputs have the same polarity as they had at the inputs. Also in this active embodiment selection of one of the two monophonic sound signals A and B is possible in the case of dual sound signal reception. If a selection of the sound signal A applied to the first signal input I1 is desired, for example, the input switches $S_{i12}$, $S_{i2}$ and $S_{i4}$ are to be continuously earth connected. If selection of the other sound signal B is desired, for example, the input switches $S_{i1}$, $S_{i12}$ and $S_{i2}$ are to be continuously earth connected.

It stands to reason that other embodiments are possible to realize the inventive idea. For example, it is possible to commonly utilize more switches than only $S_{O1}$ and $S_{O4}$ for certain capacitors or to introduce more parallel switches, to use a different mode of sign inversion, to choose a switching frequency with capacitance values adapted thereto which are different from the aforementioned and/or to perform the same operation in the channel between the second signal input I2 and the second signal output O2, as for example, in the circuit part between the second signal input I2 and the first integrator INT1.

What is claimed is:

1. A dematrixing circuit of the switched-capacitor type for dual channel TV stereo sound signals, comprising first and second signal inputs for applying a stereo sum signal thereto and one of the two left and right stereo signals, the amplitude of said latter stereo signal being twice as large as that of each of the two stereo signals in the stereo sum signal, first and second signal outputs for supplying the dematrixed stereo signals, first and second capacitors each being incorporated between an input switch and an output switch, said first capacitor being arranged through its input and output switches between the first signal input and a point of reference potential in a first switching phase and between the point of reference potential and a first integrator in a second switching phase, said second capacitor being arranged through its input and output switches between the second signal input and in the first switching phase, a third capacitor coupled to the reference potential and in the second switching phase being short-circuited across the reference potential, said third capacitor being coupled in a switchable manner via a series switch to the said integrator, said series switch being opened in the first switching phase and realizing a through-connection in the second switching phase, said first integrator being coupled to the first signal output, and said capacitors mutually having substantially equal values.

2. A dematrixing circuit as claimed in claim 1, further comprising a fourth capacitor which is incorporated between input and output switches and is arranged via said switches between the second signal input and the point of reference potential in said first switching phase, and between the point of reference potential and a second integrator in the said second switching phase, said second integrator being coupled to the second signal output.

3. A dematrixing circuit as claimed in claim 2, wherein each of the two integrators is provided with an operational amplifier over which a negative feedback is applied through a negative feedback capacitor from the output to the inverting input, said negative feedback capacitor being bridged in a switchable manner by a further capacitor which is short circuited across the reference potential in the first clock phase, which is arranged in parallel with the negative feedback capacitor in the second clock phase.

4. A dematrixing circuit as claimed in claim 3, wherein the switching frequency is substantially 40 times the line frequency of a standardized TV signal, wherein the negative feedback capacitor has a value substantially 30 times the further capacitor and wherein the fourth capacitor has a value which is mainly equal to that of the first capacitor.

5. A dematrixing circuit as claimed in claim 3, suitable for processing at least one of two TV sound signals, wherein the first capacitor comprises first and second sub-capacitors of mutually equal values, one of the sub-capacitors being arranged between the said input and output switches of the first capacitor, the other sub-capacitor being arrangeable in parallel across the said one sub-capacitor via at least one further switch in the two switching phases, said further switch connecting the said other sub-capacitor unilaterally and continuously to the reference potential for processing an audio signal applied to the first signal input, and said second capacitor being continuously short-circuited across the reference potential.

6. A dematrixing circuit as claimed in claim 5, wherein the capacitance of each of the subcapacitors of the first capacitor is substantially equal to that of the said fourth capacitor, and is twice the further capacitance of each of the first and second integrators.

* * * * *